United States Patent
Tochigi et al.

(10) Patent No.: US 7,929,187 B2
(45) Date of Patent: Apr. 19, 2011

(54) IMAGE OPTICAL SYSTEM AND IMAGE READING APPARATUS EQUIPPED WITH SAME

(75) Inventors: Nobuyuki Tochigi, Utsunomiya (JP);
Takeyoshi Saiga, Utsunomiya (JP);
Tadao Hayashide, Utsunomiya (JP);
Kazuyuki Kondo, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/696,108

(22) Filed: Jan. 29, 2010

(65) Prior Publication Data

US 2010/0128329 A1 May 27, 2010

Related U.S. Application Data

(63) Continuation of application No. 11/219,654, filed on Sep. 7, 2005, now Pat. No. 7,684,094.

(30) Foreign Application Priority Data

Sep. 13, 2004 (JP) ................................. 2004-265376

(51) Int. Cl.
*H04N 1/46* (2006.01)
*H04N 1/04* (2006.01)

(52) U.S. Cl. ........................................ 358/510; 358/480

(58) Field of Classification Search .................. 358/408, 358/509, 510, 480, 493, 494, 514
See application file for complete search history.

(56) References Cited

U.S. PATENT DOCUMENTS

| | | | |
|---|---|---|---|
| 5,025,268 A | 6/1991 | Arimoto et al. | 346/108 |
| 5,179,465 A * | 1/1993 | Kondo | 359/218 |
| 5,530,592 A | 6/1996 | Tochigi | 359/687 |
| 5,537,255 A | 7/1996 | Tochigi | 359/684 |
| 5,612,825 A * | 3/1997 | Horiuchi et al. | 359/687 |
| 5,825,560 A | 10/1998 | Ogura et al. | 359/822 |

(Continued)

FOREIGN PATENT DOCUMENTS

EP 0 814 596 A2 12/1997

(Continued)

OTHER PUBLICATIONS

Patent Abstracts of Japan, vol. 017, No. 261 (E-1369), May 21, 1993 (JP-A 5-3528, Jan. 8, 1993) Feb. 17, 2006 Search Report in European Patent Application No. 05255469.

(Continued)

*Primary Examiner* — Douglas Q Tran
(74) *Attorney, Agent, or Firm* — Fitzpatrick, Cella, Harper & Scinto

(57) ABSTRACT

An object is to provide an imaging optical system having a very simple structure that can read image while maintaining excellent image quality without suffering from significant asymmetrical aberrations. An imaging optical system for image reading is adapted to form an image of image information on a surface of an original onto a line sensor while changing a relative position of the original surface and the line sensor to allow the line sensor to read the image information. The imaging optical system includes two off-axial reflecting surfaces, and the two off-axial surfaces are a plus deflecting surface and a minus deflecting surface, or a minus deflecting surface and a plus deflecting surface disposed in the mentioned order from the original surface side, where an off-axial reflecting surface that deflects a reference axis beam clockwise is defined as a minus deflecting surfaces and an off axial reflecting surface that deflects the reference axis beam anti-clockwise is defined as a plus deflecting surface.

4 Claims, 13 Drawing Sheets

U.S. PATENT DOCUMENTS

| | | | |
|---|---|---|---|
| 5,847,887 A | 12/1998 | Ogura et al. | 359/822 |
| 5,963,378 A * | 10/1999 | Tochigi et al. | 359/687 |
| 6,049,431 A * | 4/2000 | Tochigi | 359/687 |
| 6,118,593 A * | 9/2000 | Tochigi | 359/687 |
| 6,208,474 B1 * | 3/2001 | Kondo | 359/775 |
| 6,320,690 B1 * | 11/2001 | Inagaki | 359/208 |
| 6,388,818 B1 * | 5/2002 | Tochigi | 359/687 |
| 6,507,444 B2 * | 1/2003 | Hayashide et al. | 359/720 |
| 6,606,207 B2 * | 8/2003 | Tochigi | 359/750 |
| 6,623,131 B2 | 9/2003 | Ooki | 359/857 |
| 7,164,517 B2 | 1/2007 | Fujino | 359/207 |
| 7,253,928 B2 | 8/2007 | Tochigi et al. | 358/408 |
| 2003/0038228 A1 | 2/2003 | Fujibayashi et al. | 250/208.1 |
| 2003/0038328 A1 * | 2/2003 | Ishio | 257/419 |
| 2003/0076606 A1 | 4/2003 | Ooki | 359/857 |
| 2003/0234966 A1 | 12/2003 | Tochigi et al. | 358/514 |
| 2004/0075913 A1 | 4/2004 | Kondo et al. | 359/726 |

FOREIGN PATENT DOCUMENTS

| | | |
|---|---|---|
| EP | 0 977 067 A2 | 2/2000 |
| EP | 1 286 208 A1 | 2/2003 |
| JP | 5-3528 | 1/1993 |
| JP | 9-005650 | 1/1997 |
| JP | 2002-335375 | 11/2002 |
| JP | 2003-057549 | 2/2003 |

OTHER PUBLICATIONS

Mar. 30, 2007 Chinese Official Action in Chinese Patent Appln. No. 200510099939.9 (with English-language translation).*

* cited by examiner

IMAGE OPTICAL SYSTEM AND IMAGE READING APPARATUS EQUIPPED WITH SAME

This application is a continuation of application Ser. No. 11/219,654 filed Sep. 7, 2005.

BACKGROUND OF THE INVENTION

1. Field of the Invention

The present invention relates to an imaging optical system and an image reading apparatus equipped with the same. The present invention can be suitably applied to image scanners and digital copying machines that can read images at high resolution with well-balanced correction of various aberrations in reading monochrome images and color images using a line sensor.

2. Related Background Art

Heretofore, there have been proposed various image reading apparatuses for reading image information on a original using a line sensor (CCD) having a plurality of light receiving elements arranged along the main scanning direction in which image information on the original or the like is read using an output signal obtained from the line sensor while the relative position of the original and the line sensor is changed along the sub-scanning direction.

FIG. 13 schematically shows the basic structure of a conventional image reading apparatus using a carriage-integrated scanning system. In the arrangement shown in FIG. 13, a light beam emitted from an illuminating light source 1 directly illuminates an original 7 placed on an original table glass 2. The optical path of a reflected light beam from the original 7 is deflected in the carriage by first, second and third turn back mirrors 3a, 3b and 3c, and then the reflected light is focused on a surface of a line sensor 5 by an imaging lens (imaging optical system) 4.

Image information of the original 7 is read by moving the carriage 6 in the direction indicated by arrow A in FIG. 13 (the sub-scanning direction) by a sub-scanning motor 8. The line sensor 5 shown in FIG. 13 is composed of a plurality of light receiving elements aligned along one dimensional direction (the main scanning direction).

FIG. 14 illustrates the basic structure of the image reading optical system shown in FIG. 13.

In FIG. 14, reference sign 144 designates the imaging optical system. Reference signs 145R, 145G and 145B respectively designate line sensors for reading image information of respective colors R (red), G (green) and B (blue), the line sensors 145R, 145G and 145B constituting the line sensor 145. Reference signs 147R, 147G and 147B designate reading areas on the surface of the original 147 corresponding to the line sensors 145R, 145G and 145B, respectively.

By scanning the surface of the original 147, it is possible to read the same point with different colors at a certain time interval. In the case where the imaging optical system 144 in the above-described structure is an ordinary refracting system, longitudinal chromatic aberration and chromatic aberration of magnification occur, which leads to defocus and misregistration in line images imaged on the line sensors 145B and 145R relative to the reference line sensor 145G. Consequently, an image reproduced by superimposing the images of the respective colors will suffer from noticeable color blurring and misregistration. Therefore, this apparatus cannot meet demands for large aperture and high resolution.

Meantime, in connection with decentered optical systems, it has recently been disclosed that it is possible to construct an optical system in which aberrations are satisfactorily corrected by introducing a concept called a reference axis and designing a constituent surface as an asymmetrical aspherical surface (see Japanese Patent Application Laid-Open No. H09-005650, U.S. Pat. No. 5,825,560 and U.S. Pat. No. 5,847,887). Japanese Patent Application Laid-Open No. H09-005650 discloses a method of designing such systems, and U.S. Pat. No. 5,825,560 and U.S. Pat. No. 5,847,887 disclose some designs of such systems.

Such a decentered optical system is referred to as an off-axial optical system. (The off-axial optical system is defined as an optical system that includes a curved constituent surface (off-axial curved surface) whose surface normal at the point of intersection with the reference axis (which is an axis defined along a beam that passes through the center of the image and the center of a pupil) is not on the reference axis, the reference axis of the off-axial optical system being a polygonal line.)

In off-axial optical systems, constituent surfaces are generally decentered, and vignetting does not occur even in reflecting surfaces. Accordingly, it is easy to construct an off-axial optical system using reflecting surfaces. In addition, by the nature of the off-axial optical system, routing of the optical path can be designed relatively freely, and it is easy to produce an integrated optical system by integrally molding constituent surfaces.

There have been disclosed imaging optical systems used for image reading to which the above-described technology is applied (see US AA2003038228 and US AA2003076606). By the technologies disclosed in these documents, off-axial optical systems free from chromatic aberration including five or six reflecting surfaces in which aberrations are satisfactorily corrected have been achieved in image reading apparatuses.

In the technology disclosed in US AA2003038228, since downsizing of the optical system is also aimed at, the embodiments disclosed therein are optical systems that are suitable for a carriage-integrated system. An embodiment of an imaging optical system used for image reading disclosed in US AA2003076606 is directed to an off-axial optical system including three reflecting surfaces, which has an optical path length long enough to apply it to a 2:1 mirror scanning type scanner.

In reflecting off-axial optical systems, it is difficult to maintain excellent optical performance while constructing all the reflecting surfaces as spherical surfaces. Accordingly, at least one rotationally asymmetrical aspherical surface (or a free curved surface) is introduced to achieve excellent optical performance.

It has been known that in optical systems composed of reflecting surfaces, decenter errors generally cause significant deterioration in optical performance. When a reflecting optical element having a rotationally asymmetrical aspherical surface (free curved surface) is introduced into an off-axial optical system, an extremely high degree of accuracy in the position of a member for holding that element is required, and the degree of accuracy required is higher than in the case of a normal spherical reflecting surface.

When, particularly, the number of surfaces is more than two, it is necessary to achieve accuracy in the relative position of the surfaces. A holding member having a complicated structure and a large size is required in order to achieve a high degree of accuracy. This leads to problems such as a decrease in the ease of assembly and an increase in the difficulty of manufacturing.

If an off-axial reflecting surface in the form of a free curved reflecting surface is to be produced using an ordinary glass material, a complicated production process will be required.

Such a surface may be produced using a plastic such as a polycarbonate, an acrylic or a polyolefin. However, in cases where the number of the surfaces is large, the problem of an increase in the manufacturing cost due to the cost for the corresponding number of molds will arise.

An object of the present invention is to provide an imaging optical system that does not suffer from asymmetrical aberration significantly even though it is composed of off-axial reflecting surfaces and can read images with a very simple structure while maintaining excellent image performance, and to provide an image reading apparatus using such an imaging optical system.

Particularly, the present invention is intended to provide an imaging optical system that is preferably used in constructing an image reading system in a digital copying machine, an image scanner or the like easily.

SUMMARY OF THE INVENTION

According to one aspect of the invention, in an imaging optical system for image reading, an image of image information on a surface of an original is formed onto a line sensor aligned in a main scanning direction and the line sensor reads the image information by changing a relative position of the original surface and the line sensor along the sub-scanning direction, wherein the imaging optical system comprises two off-axial reflecting surfaces, and the two off-axial reflecting surfaces are a plus deflecting surface and a minus deflecting surface, or a minus deflecting surface and a plus deflecting surface disposed in the mentioned order from the original surface side in the optical path of the imaging optical system, where an off-axial reflecting surface that deflects a reference axis beam clockwise is defined as a minus deflecting surfaces and an off axial reflecting surface that deflects the reference axis beam anticlockwise is defined as a plus deflecting surface.

According to a further aspect of the invention, the imaging optical system has a stop provided in the optical path between the two off-axial reflecting surfaces.

According to a further aspect of the invention, in the imaging optical system, the imaging optical system images image information on the original surface onto the line sensor without forming an intermediate image.

According to a further aspect of the invention, in the imaging optical system, the two off-axial reflecting surfaces comprise free curved reflecting surfaces that are symmetrical in the main scanning direction and asymmetrical in the sub-scanning direction with respect to a reference axis.

According to a further aspect of the invention, in the imaging optical system, the following condition is satisfied:

$-30° < \theta < 30°$ where $\theta$ is the angle formed by the reference axis beam incident on the first off-axial reflecting surface of the two off-axial reflecting surfaces of the imaging optical system that is disposed in the optical path in the original surface side and the reference axis beam exiting from the second off-axial reflecting surface of the two off-axial reflecting surfaces that is disposed in the optical path in the line sensor side.

According to another aspect of the invention, an image reading apparatus comprises an imaging optical system set out in the foregoing, an original table on which the original is to be placed, a line sensor on which image information on the original surface is to be imaged, and moving means for moving the original table and the line sensor relatively.

According to the present invention, in an image reading apparatus using a line sensor equipped in an image scanner, a digital copying machine or the like, it is possible to realize a high-performance imaging optical system for image reading that does not suffer from significant chromatic aberrations and has a very simple structure including two off-axial reflecting surfaces.

DESCRIPTION OF THE PREFERRED EMBODIMENTS

Prior to description of embodiments, the way of expressing specifications of imaging optical systems (optical systems) of the embodiments, and features that are common to all of the embodiments will be described.

Figure 15:
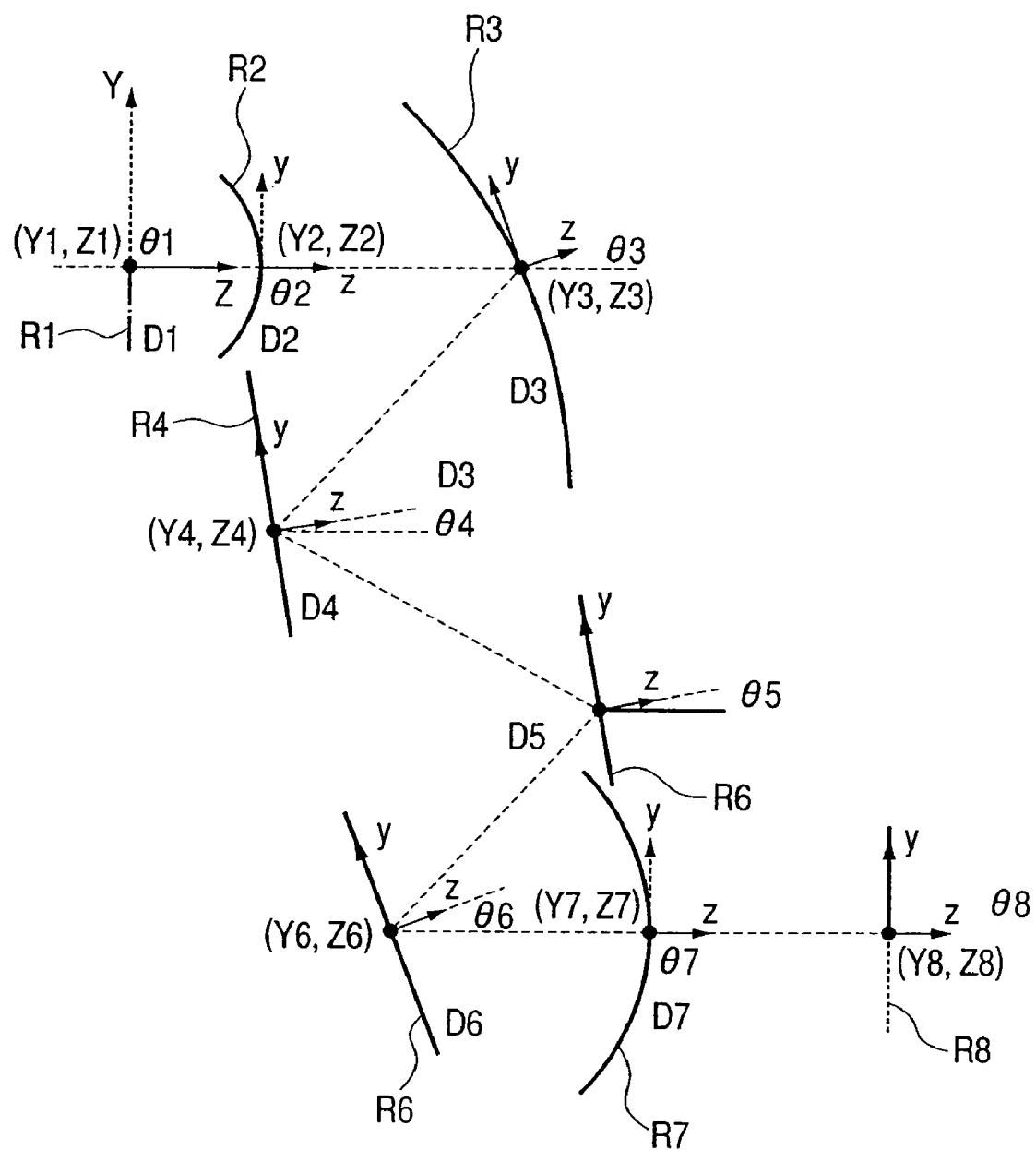
FIG. 15 illustrates a definition of the off-axial optical system.

FIG. 15 illustrates a coordinate system used in defining data of the configuration of the imaging optical system according to the present invention. In the following embodiments, surface number i will be used, where the surface is numbered along a beam La1 traveling from the object side to the image plane (the beam being represented by a chain line in FIG. 15 and called a reference axis beam).

In FIG. 15, the 1st surface R1 is a stop, the 2nd surface R2 is a refracting surface coaxial with the 1st surface, the 3rd surface R3 is a reflecting surface tilted relative to the 2nd surface R2, the 4th surface R4 and the 5th surface R5 are reflecting surfaces shifted and tilted relative to the respective preceding surfaces, and the 6th surface R6 is a refracting surface shifted and tilted relative to the 5th surface. The 2nd surface R2 through the 6th surface R6 are formed on one optical element made of a transparent medium such as a glass or a plastic.

Therefore, in the arrangement shown in FIG. 15, the medium between the object surface (not shown) to the 2nd surface R2 is air, the medium from the 2nd surface R2 to the 6th surface R6 is a certain common medium, and the medium between the 6th surface to the 7th surface (e.g., the image plane, not shown) R7 is air.

Since the imaging optical system according to the present invention is an off-axial optical system, the surfaces composing the imaging optical system do not have a common optical axis.

In view of this, in the embodiments, an absolute coordinate system having an origin located at the center of the beam effective diameter of the 1st surface is firstly set. In addition to setting the origin to the center point of the beam effective diameter of the 1st surface, the path of a beam (reference axis beam) that passes through the origin and the center of the last imaging surface is defined as the reference axis of the imaging optical system. The reference axis in the embodiments is directional in the direction in which the reference axis beam travels for imaging.

In the embodiments of the present invention, the reference axis serving as a reference for the imaging optical system is defined as above. However, in defining the axis serving as a reference for the imaging optical system, any axis that is suitable for designing the optical system, in compensating aberrations, or in expressing the shape of the surfaces composing the imaging optical system may be set. Nevertheless, the reference axis serving as a reference for the optical system is generally set to the path of a beam that passes through the center of the image plane and the center of any one of a stop, the entrance pupil, the exit pupil or the center of the 1st or last surface of the optical system.

As per the above, in the embodiments of the present invention, the reference axis is set to the path of the beam (reference axis beam) that passes through the central point of the beam effective diameter of the 1st surface, i.e., the stop, and enters the center of the last imaging surface while being refracted and reflected by the refracting surfaces and the reflecting surfaces. The surfaces are numbered in the order in which the reference axis beam undergoes refraction and reflection.

Therefore, the reference axis changes its direction in the order of the surfaces in accordance with the law of refraction or the law of reflection and eventually reaches the center of the image plane.

The tilt surfaces that constitute the imaging optical system of each embodiment of the present invention are tilted basically in the same plane. Accordingly, the axes of the absolute coordinate system are defined as follows.

Z axis: the reference axis passing through the origin and extending toward the 2nd surface R2.
Y axis: the straight line passing through the origin and oriented in the direction 90-degree-anticlockwisely rotated with respect to the Z axis in the tilt plane (i.e., the plane of the drawing sheet of FIG. 15).
X axis: the straight line passing through the origin and orthogonal to the Z and Y axes (i.e., the line perpendicular to the plane of the drawing sheet of FIG. 15).
It is easier to recognize the surface shape of the i-th surface that constitutes the imaging optical system expressed in a local coordinate system whose origin is at the intersection of the reference axis and the i-th surface, than that expressed in the absolute coordinate system. Therefore, in the embodiments of the present invention for which configuration data of the imaging optical system will be presented, the surface shape of the i-th surface will be expressed using the local coordinate system.

The tilt angle of the i-th surface within the YZ plane is represented by angle $\theta i$ (in degrees) measured in anticlockwise direction from the Z axis of the absolute coordinate system. Accordingly, in the embodiments of the present invention, the origin of the local coordinate system of each surface is within the YZ plane in FIG. 15. There is no decentration of the surfaces in the XZ plane and the XY plane. The y and z axes of the local coordinate system (x, y, and z) of the i-th surface are inclined relative to the absolute coordinate system (X, Y, Z) within the YZ plane by angle $\theta i$. Specifically, the local coordinate system is set in the following way.

z axis: the straight line passing through the origin of the local coordinate system and forming angle $\theta i$, in the anticlockwise direction, with the Z direction of the absolute coordinate system within the YZ plane.
y axis: the straight line passing through the origin of the local coordinate system and forming an angle of 90°, in the anticlockwise direction, with the z direction within the YZ plane.
x axis: the straight line passing through the origin of the local coordinate system and perpendicular to the YZ plane.

Di is a scalar representing the distance between the origins of the local coordinate systems of the i-th surface and the (i+1)th surface. Ndi and vdi are the refractive index and the Abbe constant of the medium between the i-th surface and the (i+1)th surface respectively. For the embodiments of the present invention, cross sectional views and numerical data of the optical system will be presented.

The spherical surface is a shape represented by the following formula.

$$z = ((x^2+y^2)/r_i)/(1+(1-(x^2+y^2)/r_i^2)^{1/2}$$

The imaging optical systems according to the embodiments of the present invention include rotationally asymmetrical aspherical surfaces, and the shape thereof will be expressed by the following formula.

$$z = C_{02}y^2 + C_{20}x^2 + C_{03}y^3 + C_{21}x^2y + C_{04}y^4 + C_{22}x^2y^2 + \\ C_{40}x^4 + C_{05}y^5 + C_{23}x^2y^3 + C_{41}x^4y + C_{06}y^6 + C_{24}x^2y^4 + \\ C_{42}x^4y^2 + C_{60}x^6 + \ldots$$

Since the above curved surface formula includes only terms of even order in x, the curved surface defined by this curved surface formula has a shape plane symmetrical with respect to the yz plane.

Since every imaging optical system of the embodiments is not a coaxial optical system, it is difficult to directly calculate its focal length based on the paraxial theory. Accordingly, the equivalent focal length $f_{eq}$ defined below will be used, $$f_{eq} = h_1/\tan(a_k'),$$

where h1 is the height of a beam incident on the 1st surface parallel to and infinitely close to the reference axis, and ak' is the angle that beam forms with the reference axis when it exits from the last surface. In this definition, when the number of the reflecting surfaces is odd, the sign of the focal length is expressed as the sign opposite to the sign in ordinary cases.

Embodiment 1

Figure 1:
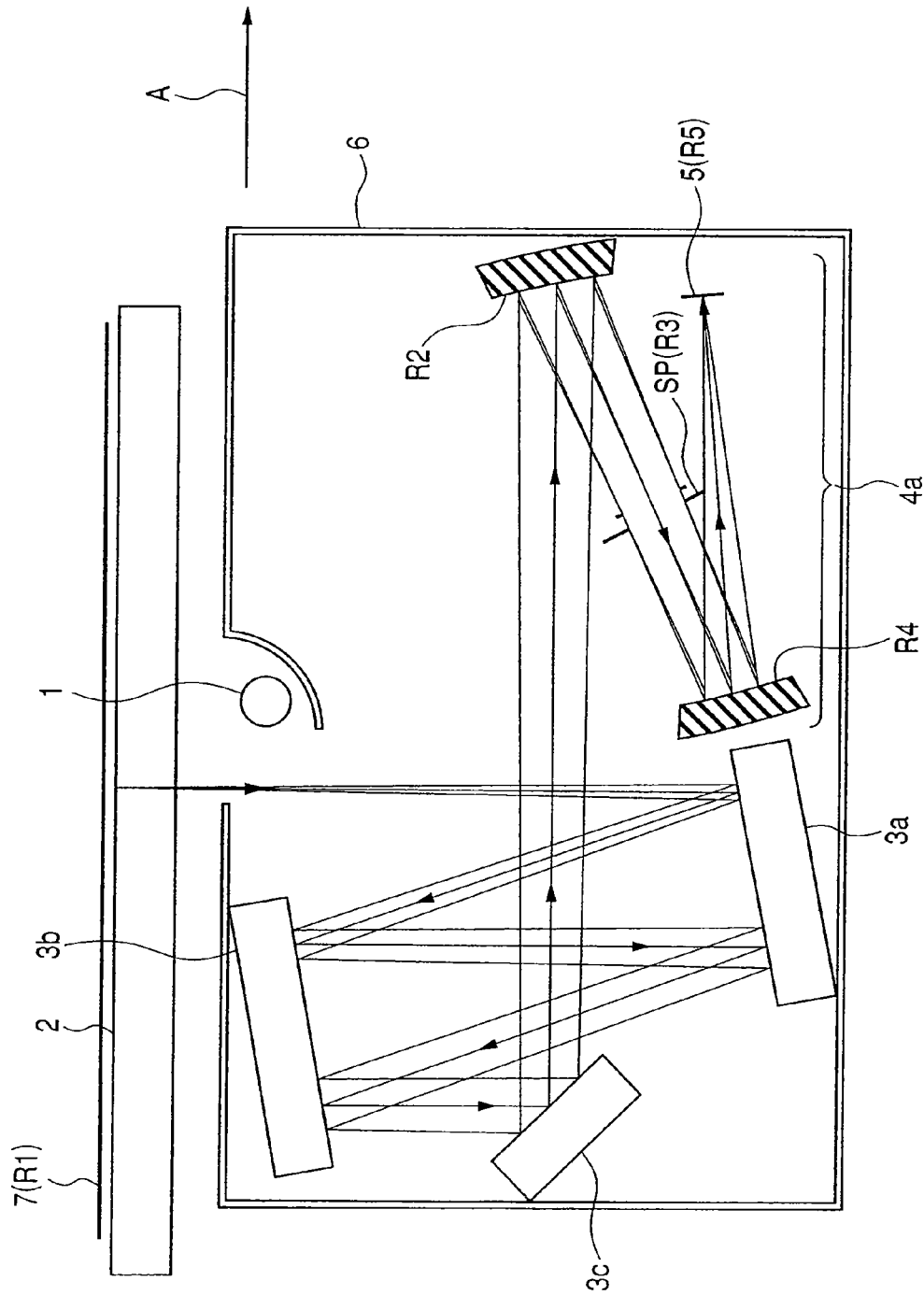
FIG. 1 schematically shows the principal portion of embodiment 1 of the image reading apparatus according to the present invention.
Figure 2:
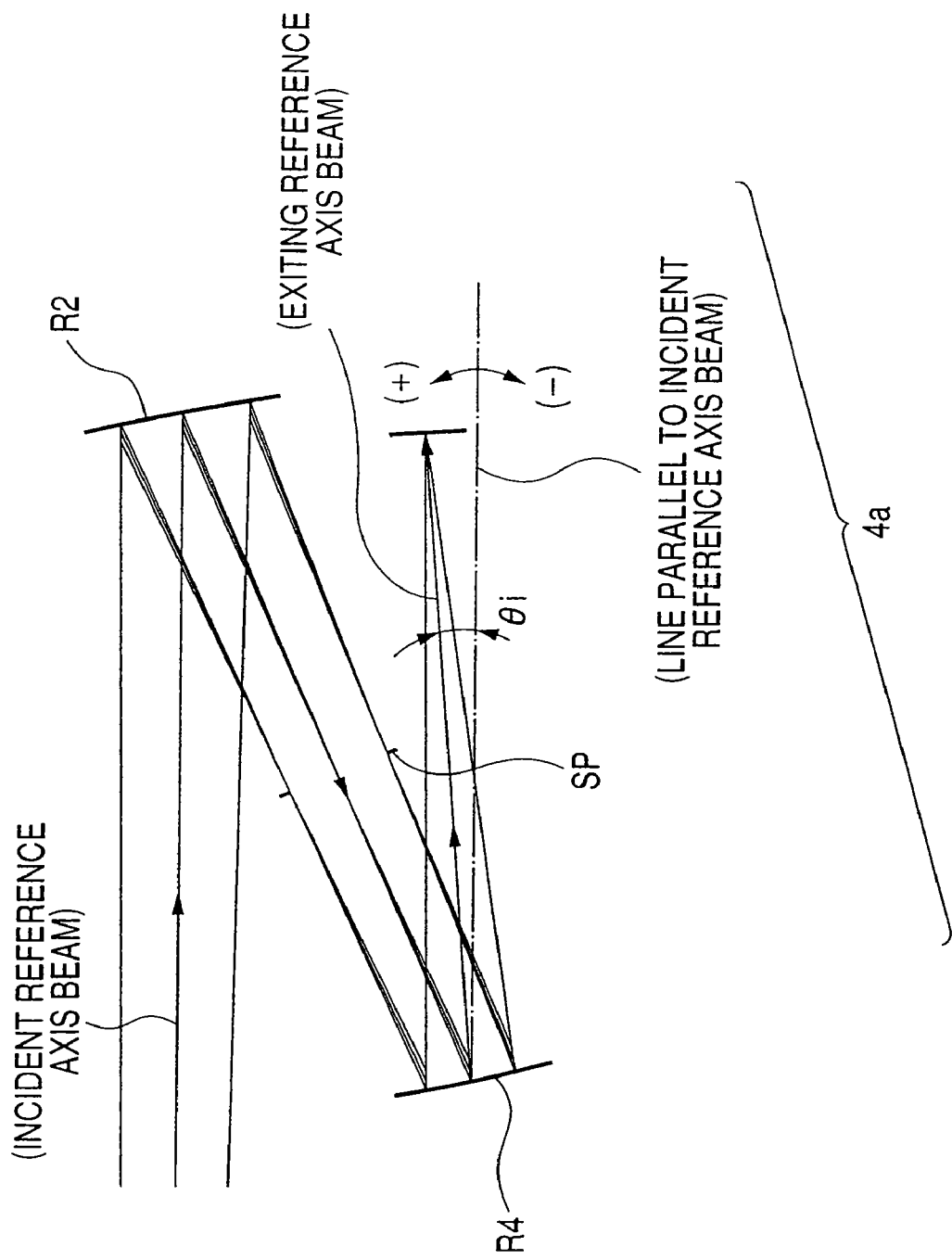
FIG. 2 is a cross sectional view of a numerical embodiment 1 of the imaging optical system for image reading according to the present invention.

FIG. 1 schematically shows the principal portion in the sub-scanning cross section of embodiment 1, in which the imaging optical system according to the present invention is applied to an image reading apparatus. FIG. 2 shows a schematic drawing of the imaging optical system 4a shown in FIG. 1 in the sub-scanning cross section.

In FIG. 1, reference numeral 1 designates a light source (light source means) composed of a fluorescent lamp, a xenon lamp or the like. Reference numeral 2 designates an original table glass, and reference numerals 3a, 3b and 3c designate the first, the second and the third reflecting mirrors respectively. Reference numeral 4a designates an imaging optical system used for image reading which includes two off-axial optical elements R2 and R4 constituted by reflecting surfaces. Reference numeral 5 designates a line sensor (light receiving means) composed, for example, of a CCD, which is disposed at the position corresponding to the image plane. Reference numeral 6 designates a carriage (casing) which houses the members 1, 3a, 3b, 3c, 4a, 5, and the like.

The direction along which the pixels of the line sensor 5 are aligned (i.e., the direction perpendicular to the plane of the drawing sheet) is the main scanning direction (in the main scanning cross section), and the direction perpendicular to the main scanning direction (in the sub-scanning cross section) (i.e., the direction within the plane of the drawing sheet) is the sub-scanning direction.

In this embodiment, the imaging optical system 4a includes two off-axial optical elements R2, R4 in the form of reflecting surfaces. Defining the off-axial reflecting surface that deflects the reference axis beam clockwise as a minus deflecting surface and the off-axial reflecting surface that deflects the reference axis beam anticlockwise as a plus deflecting surface, the two off-axial reflecting surfaces R2 and R4 are arranged to be, in order from the original surface 7 side, a plus deflecting surface and a minus deflecting surface, or a minus deflecting surface and a plus deflecting surface, thereby achieving an excellent optical performance.

The off-axial optical element R2 is a plus deflecting surface that deflects the reference axis beam in the anticlockwise direction, and the off-axial optical element R4 is a minus deflecting surface that deflects the reference axis beam in the clockwise direction.

The imaging optical system 4a for image reading according to this embodiment does not have a refracting surface having an optical power, but is composed of two off-axial optical elements R2 and R4. If an element such as a prism having refracting effect at its incidence surface and exit surface is used, chromatic aberration occurs due to characteristics of the glass material of the prism, and the problem of color misalignment in a read image arises, though problems involved by decentration are mitigated. Such a problem is prevented in this embodiment by the above-described feature.

An original 7 (the object) placed on the original table glass 2 is illuminated by a light beam from the light source 1, and light reflected from the original 7 is focused by the imaging optical system 4a via the reflecting mirrors 3a, 3b and 3c to form an image on the line sensor 5. During this process, the relative position of the original 7 and the carriage 6 is changed along the sub-scanning direction (indicated by arrow A) to read the original 7 two-dimensionally.

To make the image reading apparatus compact, the first, the second and the third reflecting mirrors 3a, 3b and 3c are used to fold the optical path. The imaging optical system 4a also serves to fold the optical path. In the imaging optical system 4a, the optical path is folded into a generally Z-shape to facilitate canceling of decentration aberrations generated at the two off-axial reflecting surfaces. Thus, excellent imaging performance is achieved in spite of its small constitution including only two surfaces.

More specifically, since the two off-axial optical elements R2 and R4 are designed to be deflecting surfaces having different signs disposed in order of a plus deflecting surface and a minus deflecting surface, or a minus deflecting surface and a plus deflecting surface from the original surface 7 side, decentration aberrations generated at the two off-axial reflecting surfaces can cancel out each other.

If deflecting surfaces having the same sign are arranged in a manner like a plus deflecting surface and a plus deflecting surface, or a minus deflecting surface and a minus deflecting surface in order from the original surface 7 side, the problem that decentration aberrations generated at the two off-axial reflecting surfaces are amplified will arise.

To achieve more excellent imaging performance, the off-axial reflecting surfaces are constructed as free curved surfaces each of which is symmetrical in the main scanning direction and asymmetrical in the sub-scanning direction with respect to the reference axis to correct decentration aberrations caused by folding of the optical path in the sub-scanning direction.

In addition, a stop SP is provided between the off-axial reflecting surfaces R2 and R4, which contributes to downsizing of the off-axial reflecting surfaces. To achieve a further reduction in the reflecting surface size, an intermediate imaging plane may be introduced. However, intermediate imaging is not introduced in this embodiment, since intermediate imaging leads to an increase in the optical path length due to the presence of a relay system or an intensification of the adverse effects of decenter errors due to an increase in the power of the reflecting surfaces.

In this embodiment, since the length of the original 7 is short in the sub-scanning direction, the size of the reflecting surfaces can be made not so large without introducing an intermediate imaging surface, so that it is possible to make the surface interval small.

According to this embodiment, by using the imaging optical system 4a described above, it is possible to construct an image reading apparatus having a carriage-integrated optical system with a small number of parts including three plane turn back mirrors and two off-axial optical elements. Accordingly, manufacturing is easy, and in addition, downsizing and high speed reading are made possible.

In the following, numerical data for numerical embodiment 1 of the imaging optical system 4a for image reading corresponding to the above-described embodiment 1 of the present invention will be presented. In addition, numerical data for numerical embodiments 2 and 3 of imaging optical systems 4a for image reading corresponding to similar embodiments will also be presented.

Figure 3:
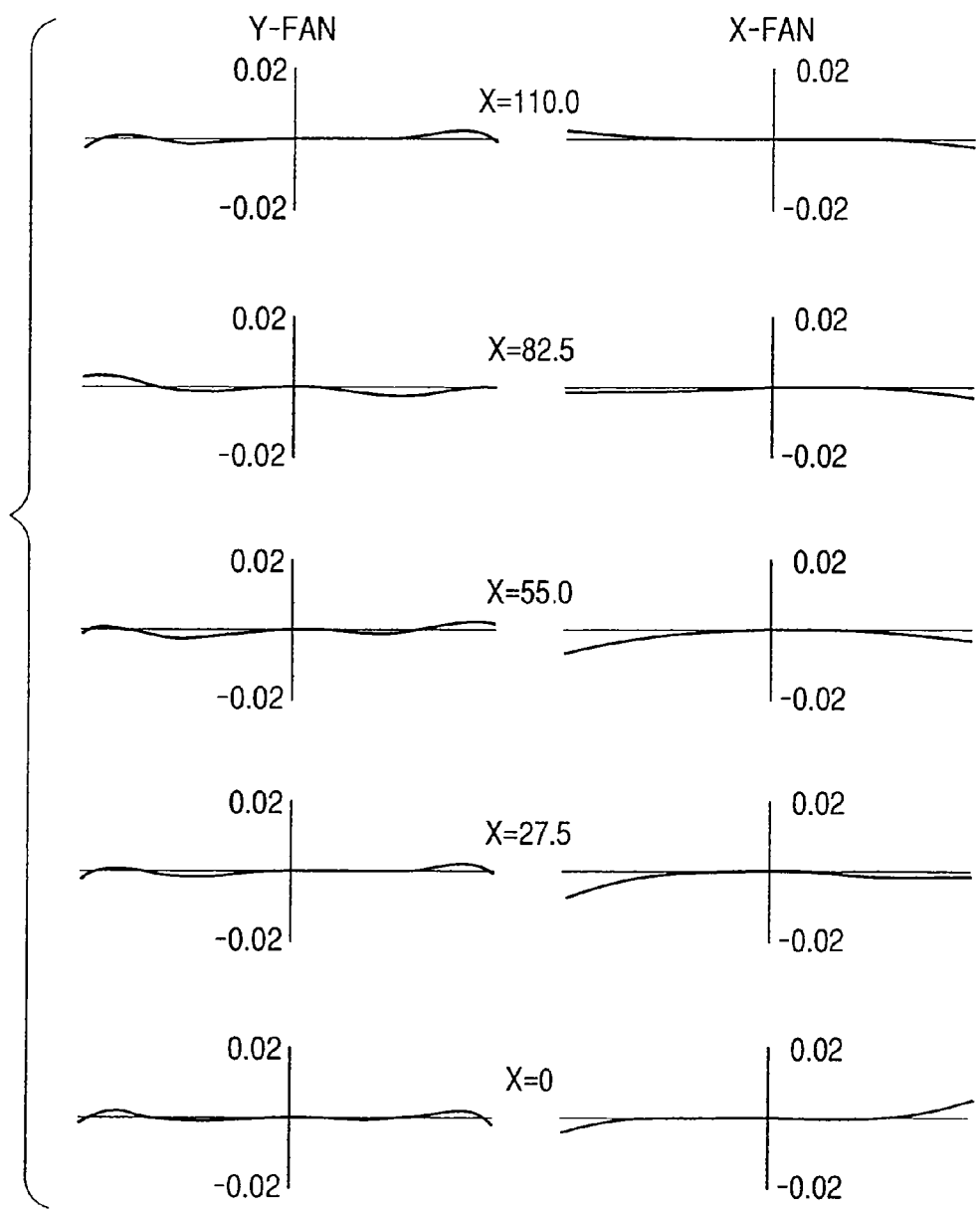
FIG. 3 shows aberrations in numerical embodiment 1 of the imaging optical system for image reading according to the present invention.
Figure 4:
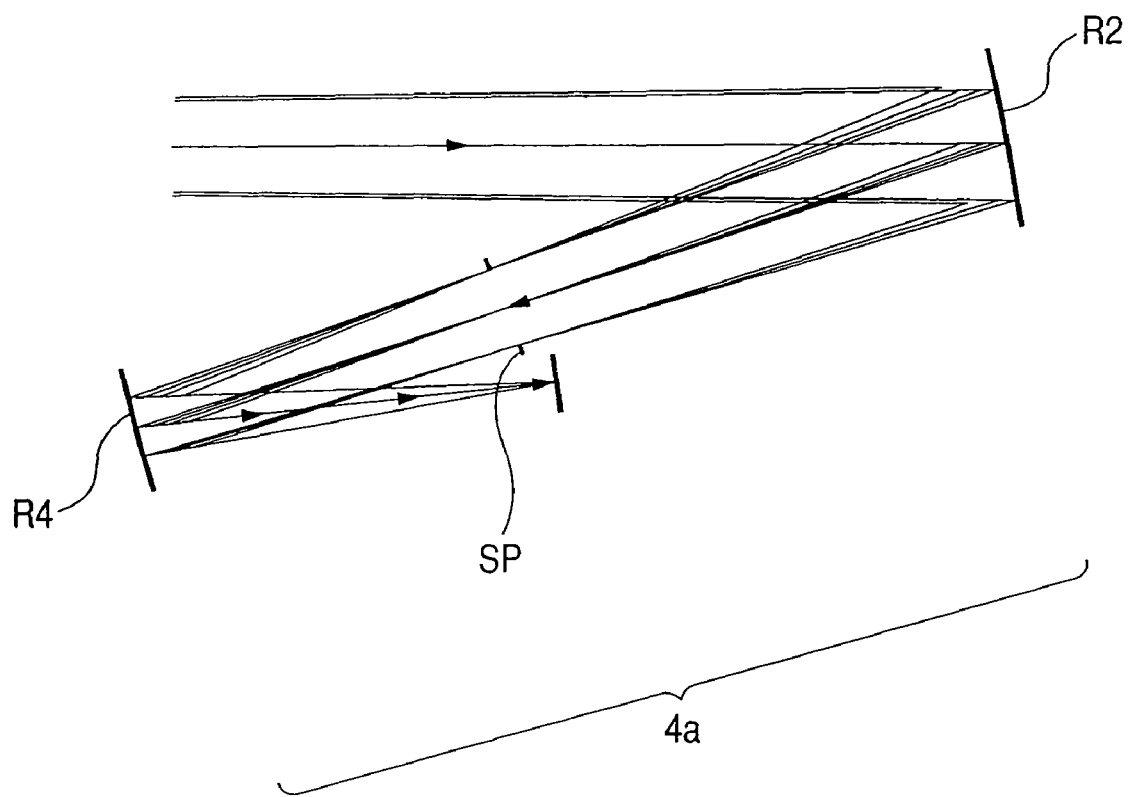
FIG. 4 is a cross sectional view of a numerical embodiment 2 of the imaging optical system for image reading according to the present invention.
Figure 5:
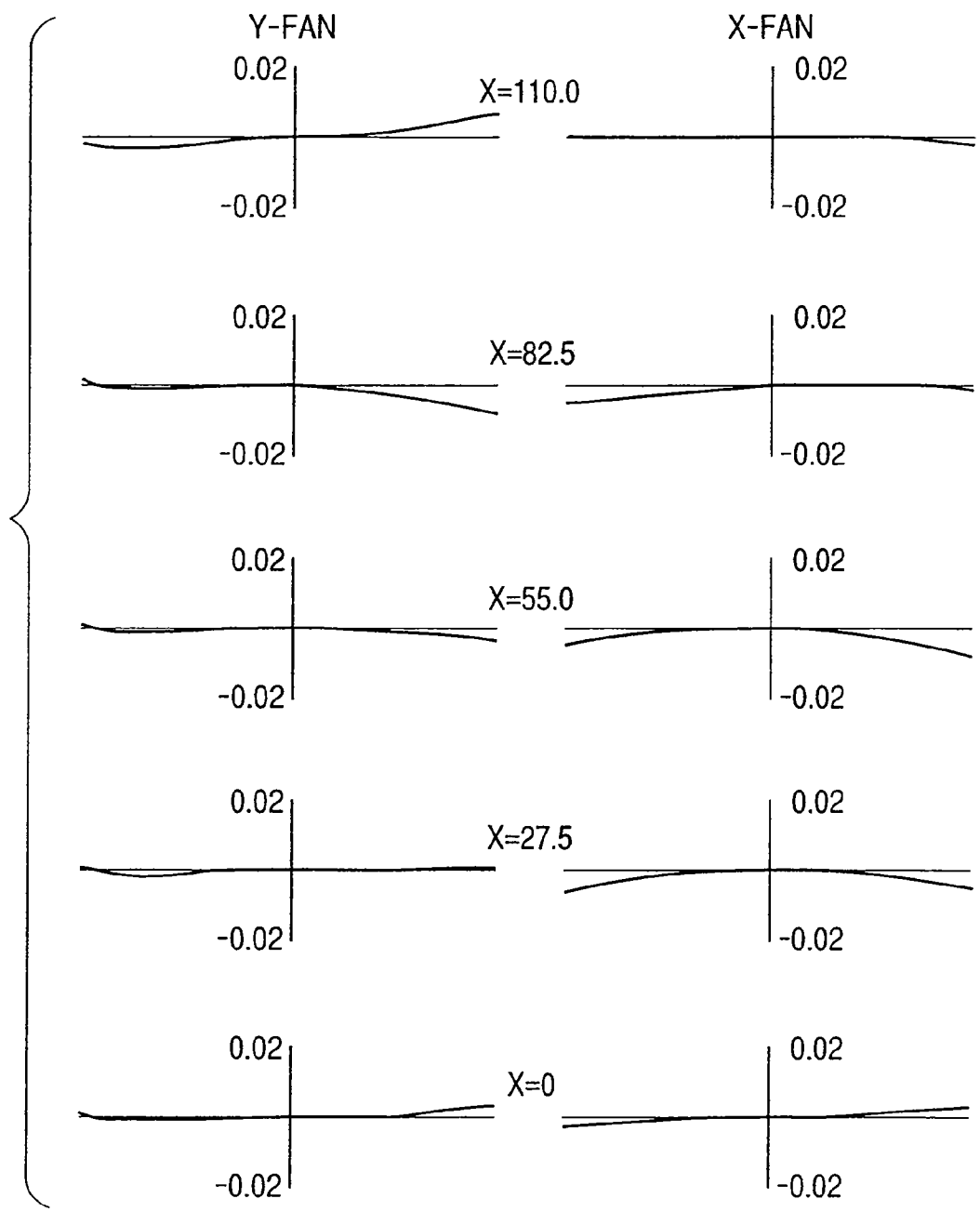
FIG. 5 shows aberrations in numerical embodiment 2 of the imaging optical system for image reading according to the present invention.
Figure 6:
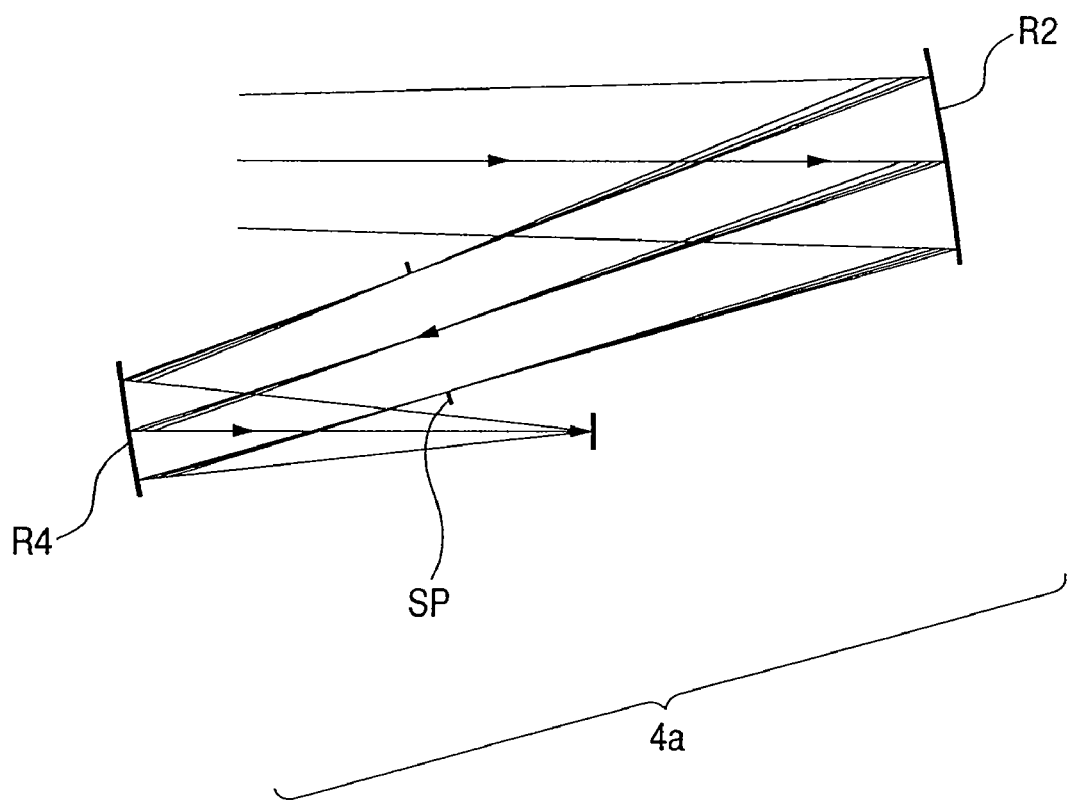
FIG. 6 is a cross sectional view of a numerical embodiment 3 of the imaging optical system for image reading according to the present invention.
Figure 7:
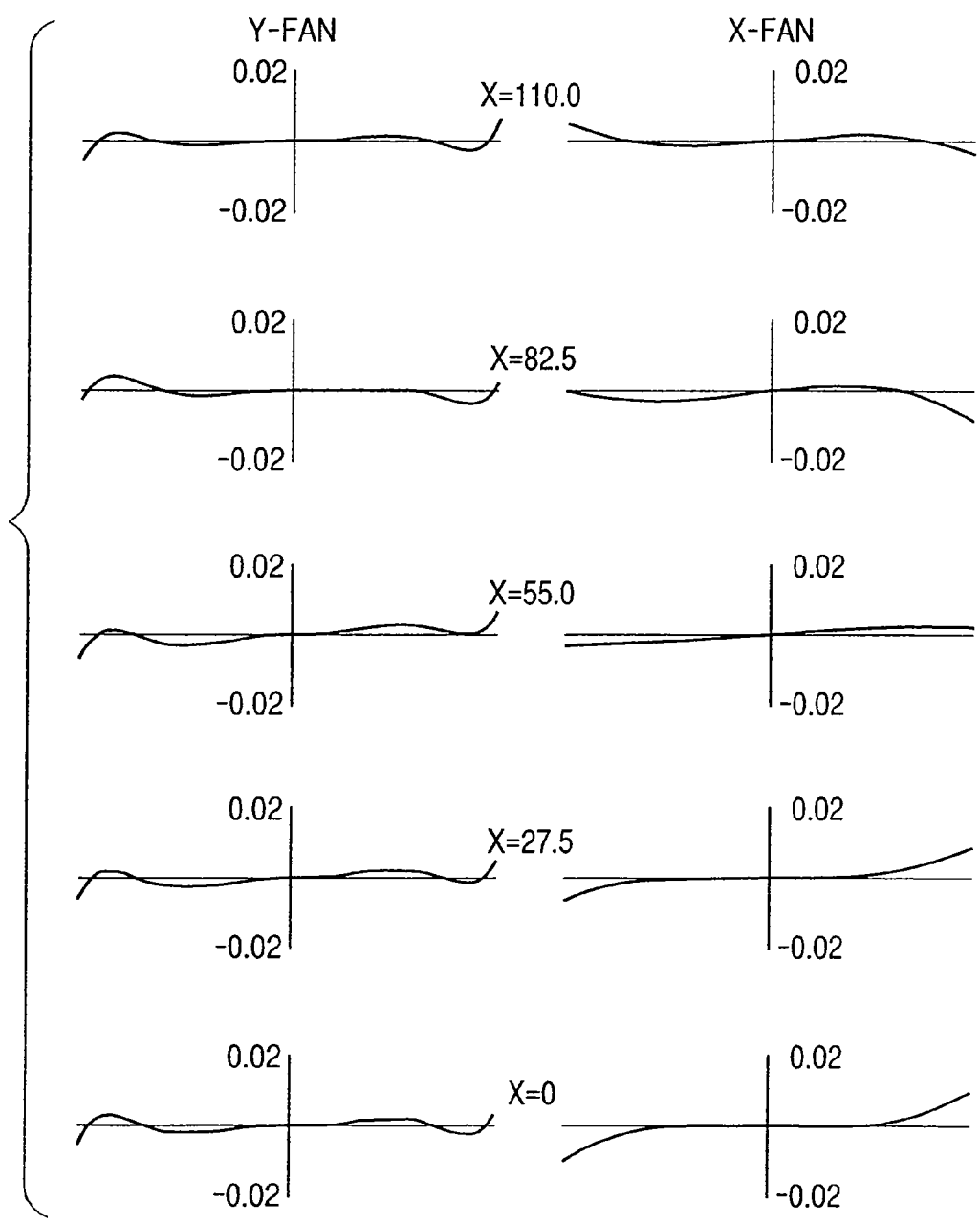
FIG. 7 shows aberrations in numerical embodiment 3 of the imaging optical system for image reading according to the present invention.

FIGS. 4 and 6 are sub-scanning cross sectional views of imaging optical systems for image reading corresponding to numerical embodiments 2 and 3 respectively. FIGS. 3, 5 and 7 show aberrations for five points (i.e., at five image heights) in aligned direction of the line sensor in numerical embodiments 1, 2 and 3 respectively. The value represented by X in FIGS. 3, 5 and 7 represents the height (image height) on the surface of the original.

This embodiment is arranged to satisfy the following condition:

$$-30° < \theta i < 30° \quad (1)$$

where $\theta i$ is the angle formed by the reference axis beam incident on the first off-axial optical element R2 of the imaging optical system 4a and the reference axis beam exiting from the second off-axial optical element R4.

The technical meaning of condition (1) will be described in the following.

Condition (1) defines the angle formed by the beam incident on the imaging optical system and the beam exiting from the imaging optical system. More specifically, it defines the angle expressing the relative relationship of the two off-axial reflecting surfaces. In the off-axial optical system, decentration aberrations occur, and it is necessary to correct the decentration aberrations. However, it is difficult to achieve satisfactory optical performance by correcting the aberrations only by means of surface shape design, since the number of the off-axial reflecting surfaces is only two. Therefore, the reference axis beam is folded into a Z-shape to facilitate mutual canceling of decentration aberrations generated at the off-axial reflecting surfaces. Further, the decentration aberrations can be canceled more easily by setting the angle to fall within the range defined by condition (1). If the off-axial reflecting surfaces are disposed in a relative relationship outside the upper or lower limit of condition (1), the amount of decentration aberrations generated at one of the surfaces becomes so large that it is difficult to cancel it by only two off-axial reflecting surfaces.

More preferably, condition (1) may be modified as follows.

$$-15° < \theta i < 15°$$

Further, in this embodiment, the following conditional expression is satisfied, $$-1.0 < C02r2/C02r4 < -0.01 \quad (2),$$

where $C02r2$ and $C02r4$ represent aspherical coefficients $C02$ of the aspherical surfaces of the first off-axial optical element R2 (reflecting surface) and the second off-axial optical element R4 (reflecting surface) as shown in FIG. 2, respectively.

The technical meaning of the conditional expression (2) is explained below.

The conditional expression (2) defines the ratio between the aspherical coefficients of the off-axial optical element R2 and the off-axial optical element R4. In particular, it defines the ratio of the refractive powers in the sub-scanning direction of the two off-axial optical elements.

Generally, the decentration aberration occurs in off-axial optical system and it needs to be corrected. However, the angle of disposition of the off-axial optical elements is limited in order to obtain a preferable optical performance while retaining the system kept in compact.

In order to obtain a preferable optical performance within the limited angle range of the disposition of the off-axial optical elements, the relation between the refractive powers in the sub-scanning direction of the two surfaces (R2 and R4) is important since the direction in which the light beam is bent is the sub-scanning direction.

If the difference of the refractive indices in the sub-scanning direction of the two surfaces is greater so that the ratio $C02r2/C02r4$ is not greater than the lower limit of the conditional expression (2), it causes a problem that the optical path is elongated in order to retain a predetermined magnification. On the other hand, if the difference of the refractive indices in the sub-scanning direction of the two surfaces is greater so that the ratio $C02r2/C02r4$ is not smaller than the upper limit of the conditional expression (2), since the light beam is reflected between the two reflecting surfaces due to the refractive powers in the sub-scanning direction, the light beam needs to be bent in the figure of 4 in order to obtain a preferable optical performance, thereby causing a problem that the imaging optical system is enlarged.

Further, the conditional expression (2) is more preferably set as follows.

$$-0.8 < C02r2/C02r4 < -0.2$$

Numerical Embodiment 1

Original Reading Width 220 mm
Imaging Magnification −0.189
NA in Original Side 0.016
feq 29.680

TABLE 1

| i | Yi | Zi | θi | Di | Ndi | | Reference signs |
|---|---|---|---|---|---|---|---|
| 1 | 0 | 0 | 0 | 166.8934 | 1 | object surface (original surface) | 7 |
| 2 | 0 | 166.8934 | 11.63 | 13.0914 | 1 | reflecting surface | R2 |
| 3 | −5.1695 | 154.8658 | 23.26 | 11.2478 | 1 | transmitting surface (stop) | SP |
| 4 | −9.6119 | 144.5325 | 13.93 | 21.8662 | 1 | reflecting surface | R4 |
| 5 | −7.8571 | 166.3281 | 4.60 | | | image plane | 5 |

Aspherical Surface Shape
Surface R2
C02=−4.5460E-03  C03=1.8570E-05  C04=−1.9333E-05
C05=1.2781E-06  C06=1.5282E-06  C07=−2.6256E-07
C08=4.0099E-08  C20=−4.7534E-03  C21=6.3040E-05
C22=−4.0753E-0.6  C23=−5.3171E-08  C24=5.5317E-07
C25=2.3713E-08  C26=−4.2652E-08  C40=2.5124E-06
C41=−6.5956E-08  C42=−2.5347E-09  C43=−8.2587E-10
C44=−8.2235E-10  C60=−3.3116E-09  C61=2.3522E-11
C62=6.4321E-11 C80=3.3081E-12
Surface R4
C02=6.8081E-03  C03=6.1342E-05  C04=−8.7196E-05
C05=−4.3217E-05  C06=1.5179E-05  C07=1.0360E-05
C08=6.6517E-07  C20=6.9865E-03  C21=8.4961E-05
C22=8.3621E-06  C23=5.2533E-07  C24=3.4662E-06
C25=−1.4766E-07  C26=−5.7376E-07  C40=−6.0197E-06
C41=−1.6224E-07  C42=2.0695E-08  C43=7.9461E-10
C44=−6.8943E-09  C60=1.5482E-08  C61=3.6681E-10
C62=−1.4023E-10 C80=−3.0158E-11

Numerical Embodiment 2

Original Reading Width 220 mm
Imaging Magnification −0.165
NA in Original Side 0.014
feq 28.927

TABLE 2

| i | Yi | Zi | θi | Di | Ndi | | Reference signs |
|---|---|---|---|---|---|---|---|
| 1 | 0 | 0 | 0 | 164.7074 | 1 | object surface (original surface) | 7 |
| 2 | 0 | 164.7074 | 9.88 | 18.8342 | 1 | reflecting surface | R2 |
| 3 | −6.3655 | 146.9815 | 19.75 | 13.9012 | 1 | transmitting surface (stop) | SP |
| 4 | −11.0637 | 133.8983 | 13.19 | 15.0900 | 1 | reflecting surface | R4 |
| 5 | −9.3200 | 148.8869 | 6.64 | | | image plane | 5 |

Aspherical Surface Shape
Surface R2
$C02=-4.8409E-03$  $C03=1.2949E-05$  $C04=1.4067E-06$
$C05=3.5016E-07$  $C06=-1.3856E-07$  $C20=-4.9915E-03$
$C21=3.6762E-05$  $C22=-3.3290E-06$  $C23=-1.9140E-08$
$C24=1.9491E-08$  $C40=7.0626E-07$  $C41=-9.2190E-09$
$C42=2.3060E-09$  $C60=-2.2285E-10$
Surface R4
$C02=1.0388E-02$  $C03=1.8869E-05$  $C04=-5.8565E-05$
$C05=-5.3466E-06$  $C06=1.1605E-05$  $C20=1.0488E-02$
$C21=6.3485E-05$  $C22=1.5856E-05$  $C23=1.9689E-07$
$C24=6.9101E-07$  $C40=-2.0168E-06$  $C41=7.2103E-09$
$C42=1.4145E-08$  $C60=2.2083E-09$

Numerical Embodiment 3

Original Reading Width 220 mm
Imaging Magnification −0.255
NA in Original Side 0.023
feq 49.819

TABLE 3

| i | Yi | Zi | θi | Di | Ndi | | Reference signs |
|---|---|---|---|---|---|---|---|
| 1 | 0 | 0 | 0 | 188.7652 | 1 | object surface (original surface) | 7 |
| 2 | 0 | 188.7652 | 9.18 | 32.7240 | 1 | reflecting surface | R2 |
| 3 | −10.3068 | 157.7066 | 18.36 | 19.1352 | 1 | transmitting surface (stop) | SP |
| 4 | −16.3337 | 139.5454 | 9.16 | 28.0560 | 1 | reflecting surface | R4 |
| 5 | −16.3539 | 167.6014 | −0.04 | | | image plane | 5 |

Aspherical Surface Shape
Surface R2
$C02=-3.2910E-03$  $C03=2.8869E-06$  $C04=4.4281E-07$
$C05=6.6841E-08$  $C06=-3.4875E-08$  $C07=-1.0234E-09$
$C08=7.2439E-10$  $C20=-3.3779E-03$  $C21=1.3092E-05$
$C22=-2.7252E-07$  $C23=1.4027E-09$  $C24=1.9624E-10$
$C25=-3.9379E-11$  $C26=-5.2793E-12$  $C40=2.5615E-07$
$C41=-2.5287E-09$  $C42=-8.2932E-11$  $C43=-9.6523E-13$
$C62=8.2234E-14$  $C80=1.2858E-14$
Surface R4
$C02=5.3904E-03$  $C03=-7.179E-06$  $C04=-1.8231E-06$
$C05=1.9647E-07$  $C06=4.9083E-07$  $C07=5.2920E-09$
$C08=-2.9427E-08$  $C20=5.5433E-03$  $C21=3.5404E-05$
$C22=5.2311E-06$  $C23=2.3961E-08$  $C24=1.0051E-08$
$C25=-1.5006E-09$  $C26=-3.9259E-10$  $C40=-5.9770E-07$
$C41=3.3155E-10$  $C42=3.5756E-10$  $C43=9.4700E-12$
$C44=8.5528E-12$  $C60=5.2122E-10$  $C61=1.5001E-12$
$C62=-2.3248E-12$  $C80=-2.2990E-13$

Embodiment 2

Figure 8:
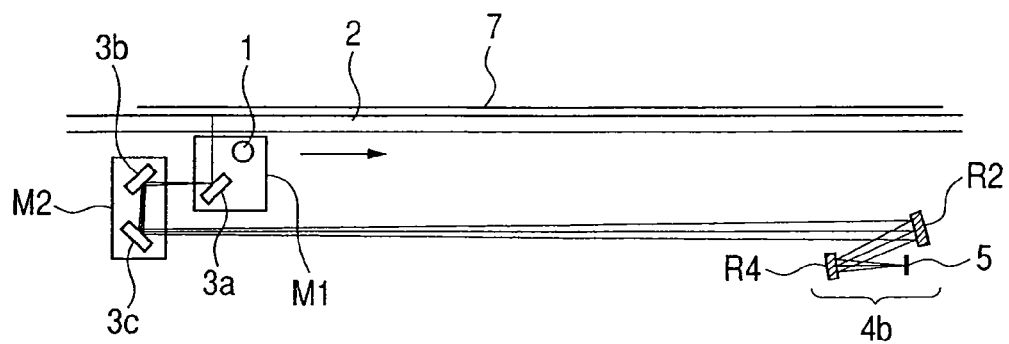
FIG. 8 schematically shows the principal portion of embodiment 2 of the image reading apparatus according to the present invention.

FIG. 8 schematically shows the principal portion of embodiment 2, in which the imaging optical system according to the present invention is applied to an image reading apparatus.

Figure 9:
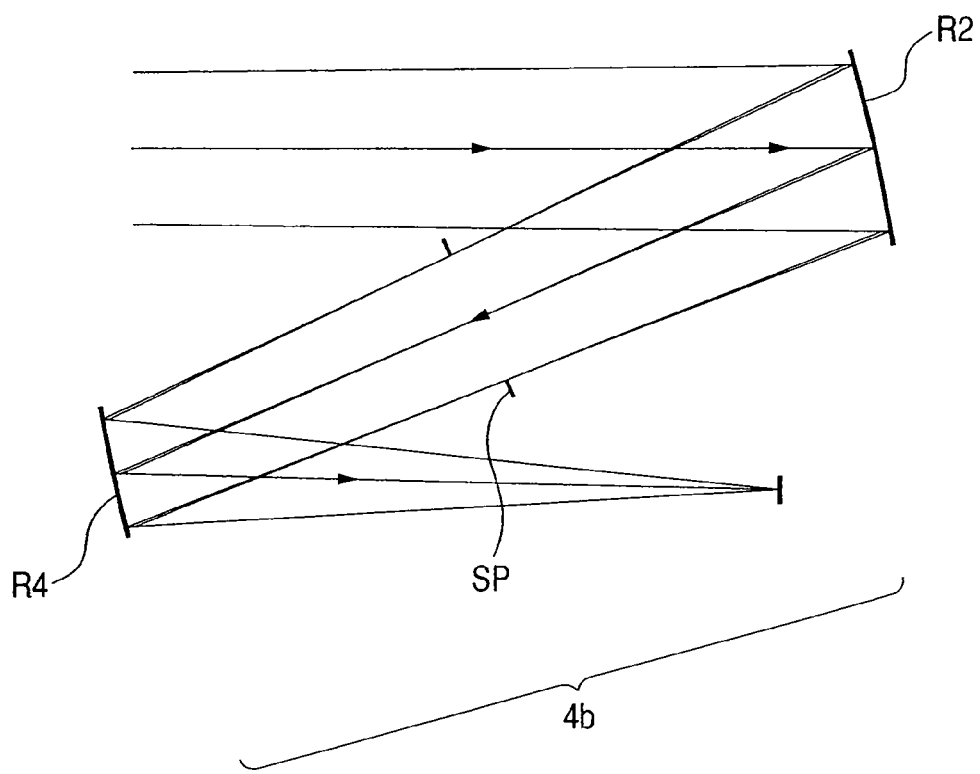
FIG. 9 is a cross sectional view of a numerical embodiment 4 of the imaging optical system for image reading according to the present invention.

FIG. 9 shows the imaging optical system 4b extracted from FIG. 8, along the sub-scanning direction.

In FIGS. 8 and 9, reference numeral 1 designates a light source (light source means) composed of a fluorescent lamp, a xenon lamp or the like. Reference numeral 2 designates an original table glass, and reference numerals 3a, 3b and 3c designate the first, the second and the third reflecting mirrors respectively. Reference numeral 4b designates an imaging optical system for image reading, which includes two off-axial optical elements R2 and R4. Reference numeral 5 designates a line sensor (light receiving means) composed, for example, of a CCD.

In this embodiment, the imaging optical system 4b for image reading is composed of off-axial optical elements 4b including two reflecting surfaces R2 and R4. The two off-axial reflecting surfaces R2 and R4 are arranged to be, in order from the original surface 7 side, a plus deflecting surface and a minus deflecting surface, or a minus deflecting surface and a plus deflecting surface, where the off-axial reflecting surface that deflects the reference axis beam clockwise is defined as a minus deflecting surface, and the off-axial reflecting surface that deflects the reference axis beam anticlockwise is defined as a plus deflecting surface.

In FIG. 8, the light beam having illuminated the original 7 is reflected by the original 7 toward the first mirror 3a mounted on a first mirror table M1. The reflected light beam includes image information of the original 7. The second mirror 3b and the third mirror 3c are disposed to direct the reflected light beam to the light receiving means 5 serving as reading means. The second mirror 3b and the third mirror 3c are made integral and mounted on a second mirror table M2 (these mirrors being arranged in an L-shape that lacks the angle portion).

Upon scanning (reading) the original, the first mirror table M1 is moved by a motor (not shown) to scan the original 7, and the second mirror table M2 is adapted to follow the movement of the first mirror table M1 at a speed half that of the first mirror table M1, whereby the optical distance between the original 7 and the imaging optical system 4b (reading system) is maintained during the scanning. Thus, the light beam from the original 7 is focused by the imaging optical system 4b onto the surface of the line sensor 5 disposed in a conjugate relationship to form an image.

The light receiving means 5 is composed, for example, of a one-dimensional line sensor (CCD) in which a plurality of elements are aligned in the main scanning direction and oriented along the main scanning direction of the original 7 surface, as is the case with embodiment 1. With the above-described structure, the original 7 placed on the original table 2 is once read along the main scanning direction, and read along the sub-scanning direction by sequential scanning movement of the first and the second mirror tables M1 and M2.

Embodiment 2 differs from embodiment 1 in that the structure of the imaging reading apparatus is a 2:1 mirror scanning system instead of a carriage-integrated scanning system, and that the optical path length from the original surface to the original side off-axial reflecting surface is elongated owing to the imaging optical system 4b for image reading being the 2:1 mirror scanning system.

By using the above-described imaging optical system 4b for image reading, it is possible to construct a 2:1 mirror scanning type image reading apparatus with a small number of parts including three plane turn back mirrors and two off axial optical elements R2, R4. Therefore, it can be manufactured very easily.

Furthermore, since the apparatus includes only reflecting surfaces, chromatic aberrations do not occur, and image reading is free from color misregistration. Therefore, related processing by software or the like can be made simple, and it is possible to manufacture an image reading apparatus easily.

In the following, numerical data for numerical embodiment 4 of the imaging optical system for image reading corresponding to the above-described embodiment 2 of the present invention will be presented. In addition, numerical data for numerical embodiment 5 of an imaging optical system for image reading corresponding to a similar embodiment will also be presented.

Figure 10:
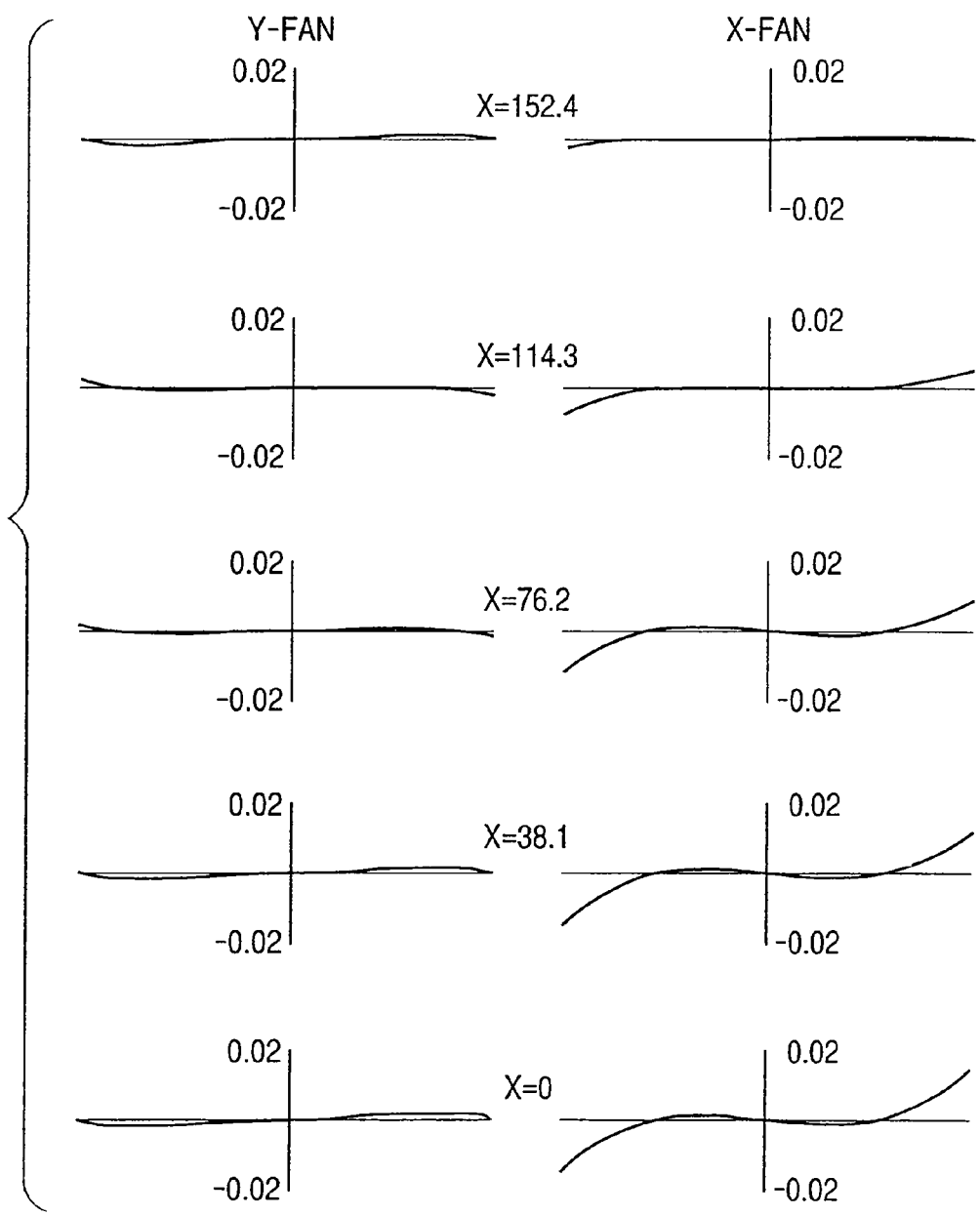
FIG. 10 shows aberrations in numerical embodiment 4 of the imaging optical system for image reading according to the present invention.
Figure 11:
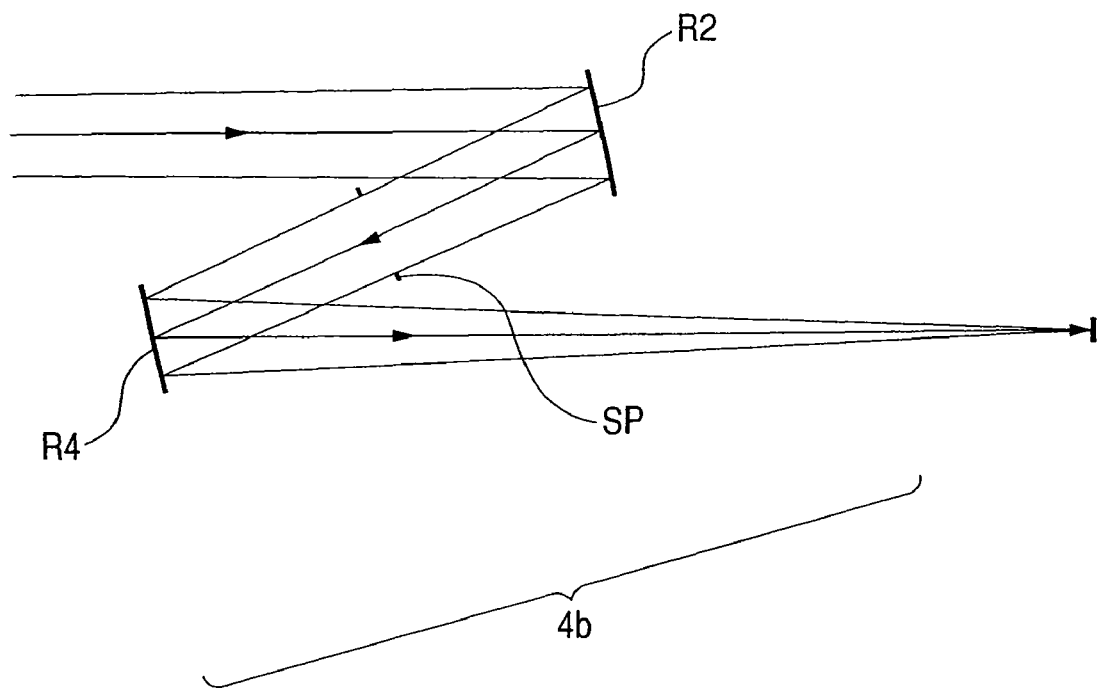
FIG. 11 is a cross sectional view of a numerical embodiment 5 of the imaging optical system for image reading according to the present invention.
Figure 12:
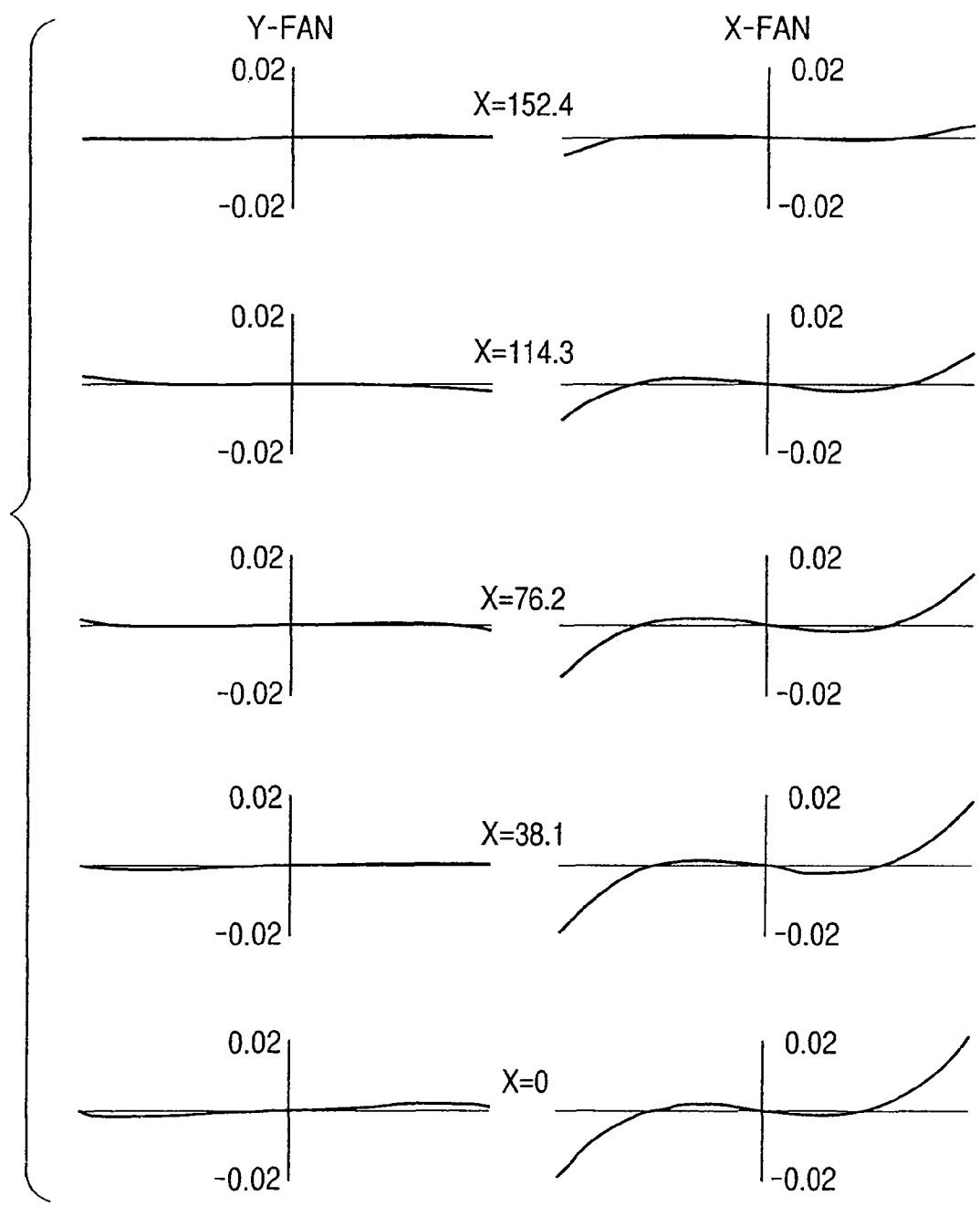
FIG. 12 shows aberrations in numerical embodiment 5 of the imaging optical system for image reading according to the present invention.
Figure 13:
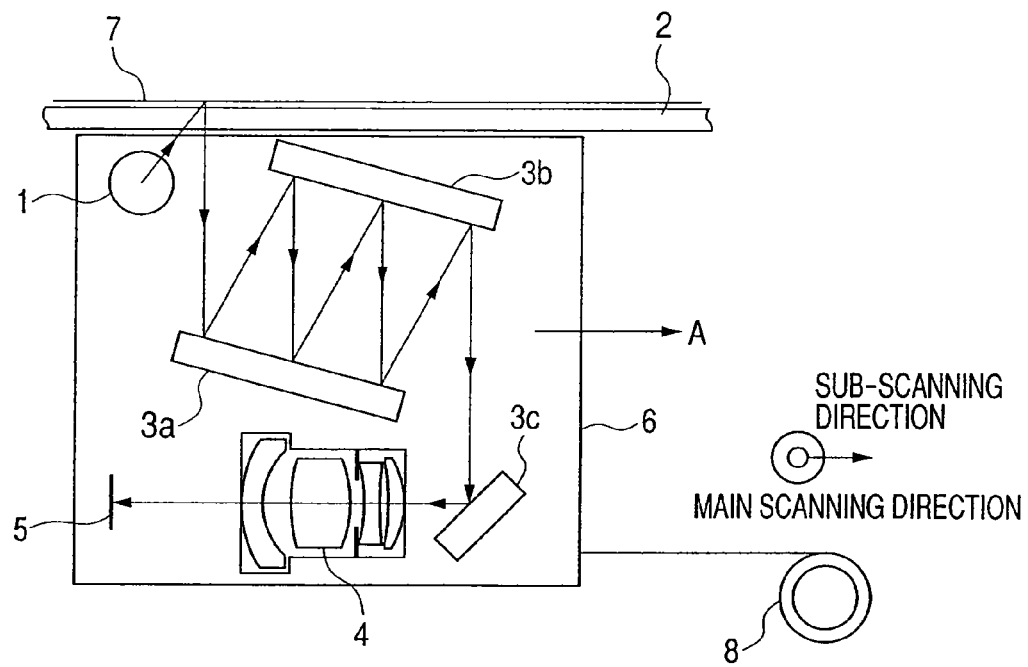
FIG. 13 schematically shows the principal portion of a conventional image reading apparatus.
Figure 14:
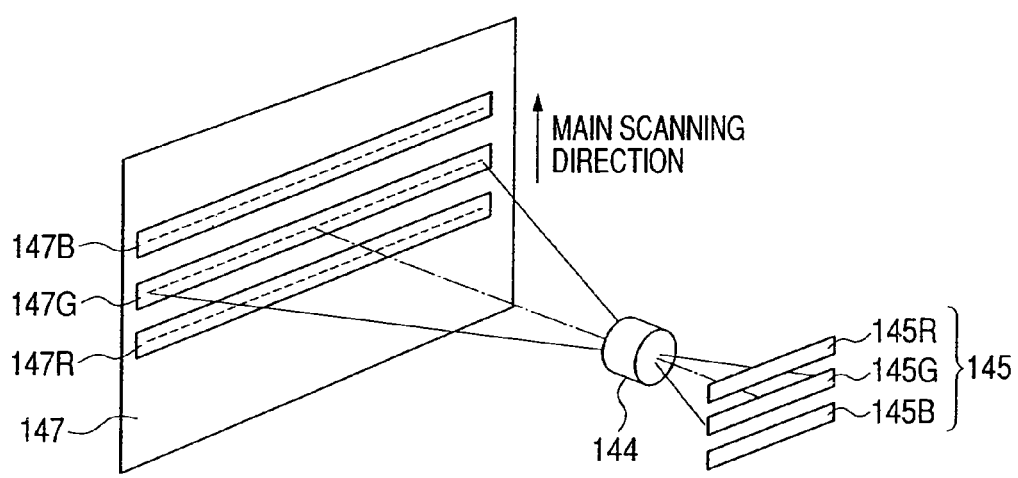
FIG. 14 shows the basic structure of a conventional color image reading apparatus.

FIG. 11 is a sub-scanning cross sectional view of an imaging optical system for image reading corresponding to numerical embodiment 5. FIGS. 10 and 12 show aberrations for five points (i.e. at five image heights) in the line direction of the line sensor in numerical embodiments 4 and 5 respectively. The value represented by X in FIGS. 10 and 12 represents the height on the surface of the original.

Numerical Embodiment 4

Original Reading Width 304.8 mm
Imaging Magnification −0.111
NA in Original Side 0.009
feq 45.093

TABLE 4

| i | $Y_i$ | $Z_i$ | $\theta_i$ | $D_i$ | $N_{di}$ | | Reference signs |
|---|---|---|---|---|---|---|---|
| 1 | 0 | 0 | 0 | 421.0883 | 1 | object surface (original surface) | 7 |
| 2 | 0 | 421.0883 | 12.0 | 19.2305 | 1 | reflecting surface | R2 |
| 3 | −7.8217 | 403.5204 | 24.0 | 17.6963 | 1 | transmitting surface (stop) | SP |
| 4 | −15.0195 | 387.3540 | 11.33 | 29.6240 | 1 | reflecting surface | R4 |
| 5 | −15.7114 | 416.9699 | −1.34 | | | image plane | 5 |

Aspherical Surface Shape
Surface R2
$C_{02}$=−3.0020E-03  $C_{03}$=4.7838E-06  $C_{04}$=2.3540E-07
$C_{05}$=9.9324E-08  $C_{06}$=−2.8659E-09  $C_{20}$=−3.1491E-03
$C_{21}$=2.5084E-05  $C_{22}$=−5.4761E-07  $C_{23}$=−1.0084E-08
$C_{24}$=−6.8492E-10  $C_{40}$=7.8808E-07  $C_{41}$=−1.6587E-08
$C_{42}$=1.2190E-09 $C_{60}$=−5.1022E-10

Surface R4
$C_{02}$=−4.4171E-03  $C_{03}$=−1.4059E-05  $C_{04}$=4.6758E-07
$C_{05}$=8.9070E-07  $006$=4.8015E-08  $C_{20}$=4.6431E-03
$C_{21}$=6.1598E-05  $C_{22}$=5.6242E-06  $C_{23}$=1.6523E-09
$C_{24}$=3.4457E-09  $C_{40}$=−1.5530E-06  $C_{41}$=−3.2913E-08
$C_{42}$=−8.0017E-09 $C_{60}$=9.5119E-10

Numerical Embodiment 5

Original Reading Width 304.8 mm
Imaging Magnification −0.220
NA in Original Side 0.017
feq 80.432

TABLE 5

| i | Yi | Zi | θi | Di | Ndi | | Reference signs |
|---|---|---|---|---|---|---|---|
| 1 | 0 | 0 | 0 | 420.0000 | 1 | object surface (original surface) | 7 |
| 2 | 0 | 420.0000 | 12.0 | 20.0000 | 1 | reflecting surface | R2 |
| 3 | −8.1347 | 401.7291 | 24.0 | 20.0000 | 1 | transmitting surface (stop) | SP |
| 4 | −16.2695 | 383.4582 | 12.0 | 76.9248 | 1 | reflecting surface | R4 |
| 5 | −16.2695 | 460.3830 | 0 | | | image plane | 5 |

Aspherical Surface Shape
Surface R2
$C02=-1.6082E-03$    $C03=3.9135E-06$    $C04=7.1800E-08$
$C05=2.6687E-08$  $C06=-1.1885E-09$  $C20=-1.6933E-08$
$C21=1.4997E-05$  $C22=-3.1463E-07$  $C23=-6.9537E-09$
$C24=-9.9100E-11$  $C40=5.1882E-07$  $C41=-1.2070E-08$
$C42=1.0832E-09$ $C60=-3.2503E-10$
Surface 4
$C02=1.9433E-03$    $C03=2.6548E-06$    $C04=6.9000E-08$
$C05=6.2702E-08$    $006=4.8170E-09$    $C20=2.0246E-03$
$C21=2.1504E-05$  $C22=9.6888E-07$  $C23=-5.0452E-09$
$C24=-2.2503E-10$  $C40=-6.6966E-07$  $C41=-1.5781E-08$
$C42=-2.2432E-09$ $C60=3.9269E-10$ In the embodiments, by constructing the imaging optical systems 4a, 4b in the above-described manner, it is possible to realize an imaging optical system that enables high performance image reading free from chromatic aberrations with a very simple structure including two off-axial reflecting surfaces, and to realize an image reading apparatus equipped with such an imaging optical system.

This application claims priority from Japanese Patent Application No. 2004-265376 filed on Sep. 13, 2004, which is hereby incorporated by reference herein.

What is claimed is:

1. An imaging optical system for image reading, in which an image of image information on a surface of an original is formed onto a line sensor aligned in a main scanning direction, and the line sensor reads the image information by changing a relative position of the original surface and the line sensor in the sub-scanning direction, wherein off-axial reflecting surfaces constituting the imaging optical system consist of a first off-axial reflecting surface and a second off-axial reflecting surface, and the first off-axial reflecting surface and the second off-axial reflecting surface are of asymmetry in the sub-scanning section with respect to a reference axis, wherein the first and second off-axial reflecting surfaces are, respectively, a plus deflecting surface and a minus deflecting surface, or a minus deflecting surface and a plus deflecting surface, disposed in the mentioned order from the original surface side in the optical path of the imaging optical system, where an off-axial reflecting surface that deflects a reference axis beam in a first direction with respect to a rotational axis which is a straight line perpendicular to the sub-scanning section in the sub-scanning section is defined as a minus deflecting surface and an off-axial reflecting surface that deflects the reference axis beam in a second direction, which is an opposite direction to the first direction, with respect to a rotational axis which is a straight line perpendicular to the sub-scanning section in the sub-scanning section is defined as a plus deflecting surface, and wherein the following condition is satisfied, $$0.01 < \phi 2/\phi 4 < 0.1,$$

where $\phi 2$ and $\phi 4$ represent refractive powers of the first and second off-axial reflecting surfaces in the sub-scanning direction, respectively.

2. An imaging optical system according to claim 1, wherein the following condition is satisfied, $$-15° < \theta < 15°,$$

where θ represents an angle in the sub-scanning section between the reference axis beam incident on the first off-axial reflecting surface and the reference axis beam exiting from the second off-axial reflecting surface.

3. An imaging optical system according to claim 2, wherein a stop is disposed in an optical path between the first off-axial reflecting surface and the second off-axial reflecting surface.

4. An image forming apparatus comprising:
an imaging optical system according to claim 1; and
a line sensor aligned in a main scanning direction,
wherein an image of image information on a surface of an original is formed onto the line sensor.

* * * * *